No. 719,575. PATENTED FEB. 3, 1903.
C. L. FERRIOTT.
SEED PLANTER.
APPLICATION FILED DEC. 1, 1902.
NO MODEL.

Witnesses
C. L. Ferriott,
Inventor:
by C. A. Snow & Co.
Attorneys

UNITED STATES PATENT OFFICE.

CHARLES L. FERRIOTT, OF BARTLETT, TEXAS.

SEED-PLANTER.

SPECIFICATION forming part of Letters Patent No. 719,575, dated February 3, 1903.

Application filed December 1, 1902. Serial No. 133,400. (No model.)

*To all whom it may concern:*

Be it known that I, CHARLES L. FERRIOTT, a citizen of the United States, residing at Bartlett, in the county of Williamson and State of Texas, have invented a new and useful Seed-Planter, of which the following is a specification.

This invention relates to seed-planters for planting corn, cotton, and other seeds; and it has special reference to that class which are known as "riding-planters" in which a seat is provided for the driver.

My present invention has for its object to provide a planter of this class in which the plows used in connection therewith for the purpose of opening a furrow to receive the seed and for covering the latter after it has been deposited may be quickly, easily, and conveniently raised from or lowered into the ground as may be required, the construction being such that not only may the plows be conveniently manipulated, but that when they are in operative position they shall resist any strain that may be exerted upon them without straining pivotal and other connections beyond their capacity of resistance.

The invention further consists in providing the standard in the furrow-opener with an auxiliary plow attachment adapted to work directly in front of the seed-tube, so as to provide the scattering of the seed and to cause it to be deposited directly in the furrow.

With these ends in view the invention consists in the improved construction, arrangement, and combination of parts, which will be hereinafter fully described, and particularly pointed out in the claims.

Figure 1:
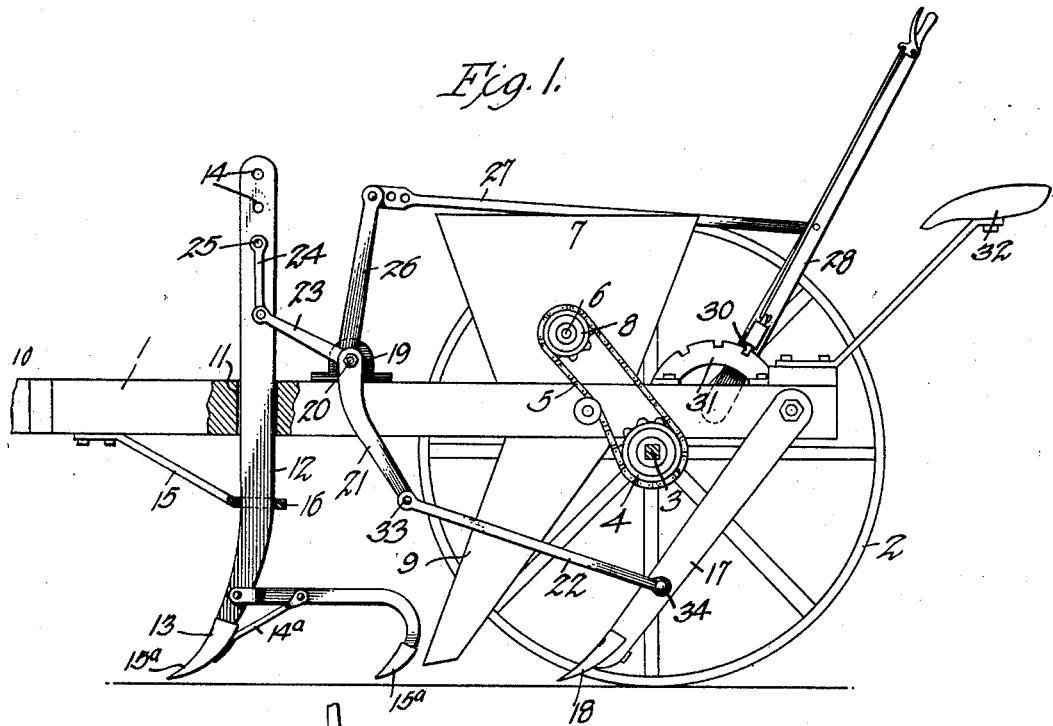
Figure 2:
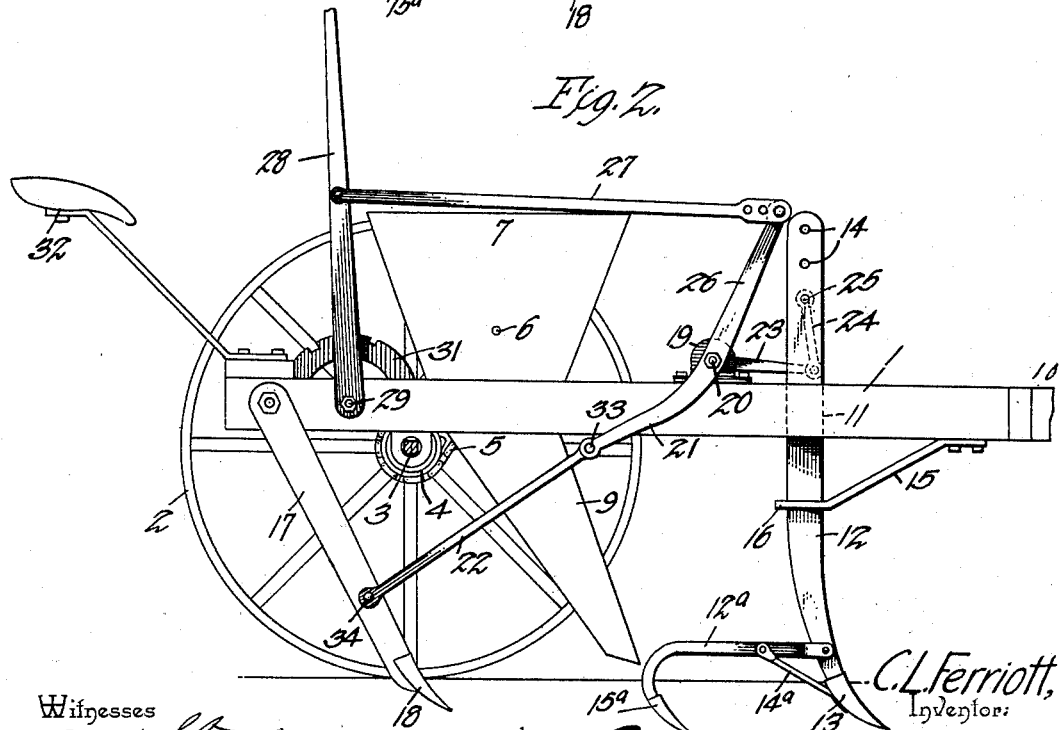

In the accompanying drawings, Figure 1 is a side view of a seed-planter embodying my invention, the near wheel having been removed. Fig. 2 is a side view taken from the opposite side, the near wheel having been removed.

Corresponding parts in the several figures are indicated by similar characters of reference.

The frame 1 of my improved seed-planter is supported upon transporting-wheels 2, mounted upon a revolving axle 3, carrying a sprocket-wheel 4, from which motion is transmitted, by means of a chain 5, to a shaft 6, which is journaled transversely in the seed-box 7 and which carries at one end a sprocket-wheel 8, engaged by the chain 5. This shaft operates the seeding mechanism, which forms no part of my present invention. A seed-spout 9 extends in the usual manner downwardly from the hopper or seedbox.

A longitudinal frame-beam which is extended forwardly to form the tongue 10 is provided with a vertical slot 11, in which is mounted a vertically-slidable shank or standard 12, the lower end of which carries the furrow-opener 13. The upper end of the standard 12 has a plurality of perforations 14. A brace-rod 15, bolted or otherwise secured to the under side of the tongue or frame-beam 10, is extended rearwardly and terminates in a loop 16, encircling the standard 12, so as to brace the latter against displacement and to form a guide when it shall be vertically adjusted, as hereinafter set forth.

12$^a$ designates a beam which is pivotally connected with the standard 12, from which it extends rearwardly and downwardly, as shown, a brace 14$^a$ serving to connect the said beam adjustably with the standard 12 near the lower end of the latter. The said beam, which is properly curved, as shown, carries an auxiliary furrow-opener 15$^a$, which is disposed directly in front of the seed-tube, and the wings of which may be extended so as to guide the seed directly to the furrow and to prevent scattering thereof. It is obvious that this auxiliary furrow-opener may be adjusted by means of the brace 14$^a$ so as to work at any desired depth in the ground.

Standards 17, which are pivotally secured to the sides of the frame near the rear end of the latter, carry the coverers 18. These, as well as the furrow-opener, may be bolted or otherwise secured to their respective standards in any suitable manner.

The frame of the machine supports, in front of the hopper, boxes or bearings 19, in which is journaled a rock-shaft 20. The latter is provided at the ends thereof with arms or cranks 21, connected by means of link-rods 22 with the standards 17. The rock-shaft 20 also has an intermediately-disposed arm or crank 23, which is pivotally connected with one end of a link-rod 24, the other end of which is pivotally and adjustably connected with the standard 12 by means of a pin or bolt 25 engaging one of the perforations 14 in said standard. It will thus be seen that the latter may be set or adjusted so as to cause the furrow-opener and the auxiliary furrow-opener to engage the soil at any desired depth. The rock-shaft 20 is provided with an additional upwardly-extending crank-arm 26, which is connected by a link-rod 27 with an operating-lever 28, fulcrumed to the frame at 29 and having a suitably-operated lock dog or pawl 30, adapted to engage a segment-rack 31, whereby the operating-lever and the parts governed thereby may be retained securely at any desired adjustment.

The frame of the machine supports a suitably-disposed seat 32 for the driver or operator, the disposition of the seat being such that the operating-lever 28 may be conveniently reached and manipulated.

The operation of this invention will be readily understood from the foregoing description, taken in connection with the drawings hereto annexed. When the plows are in the ground, the relative disposition of the crank-arms 21 and the link-rods 22 is such that their pivotal connecting-point 33 shall be included in lines drawn through the axis of the rock-shaft and the pivotal connecting-points 34, at which the link-rods 22 are connected with the said standards. It will thus be seen that the connecting members will be relieved from excessive strain and will be fitted to perform the requisite work without danger of injury. The front standard, carrying the furrow-opener and the auxiliary furrow-opener, is likewise thoroughly braced by the member 15. Whenever desired, the driver by manipulating the lever 28 may oscillate the rock-shaft, thus shifting the position of the plow-carrying members from a raised to a lowered position, or vice versa.

The general construction of my improved device is simple, and it may at a trifling expense be applied to planters of ordinary construction.

Having thus described the invention, what I claim is—

1. In a planter, a slotted frame-beam, a standard vertically slidable therein and carrying a furrow-opener, a brace-rod secured to the under side of the frame-beam, extending rearwardly, and having a loop encircling said standard, and means for vertically adjusting the latter.

2. In a planter, a slotted frame-beam, a standard vertically slidable therein and carrying a furrow-opener, a beam connected pivotally with said standard and carrying an auxiliary furrow-opener, a brace connecting said beam adjustably with the standard, a brace-rod secured to the under side of the frame-beam extending rearwardly and having a loop encircling said standard and means for vertically adjusting the latter.

3. In a planter, a frame, a seedbox and seed-spout supported by said frame, a vertically-adjustable standard carrying a furrow-opener, a beam connected pivotally with said standard and carrying an auxiliary furrow-opener disposed directly in front of the seed-spout, a brace connecting said beam adjustably with the standard, and adjusting means for the latter.

4. In a planter, a frame, standards pivotally connected to the sides thereof, and carrying covering-plows, a rock-shaft mounted transversely upon the frame and having crank-arms at the ends thereof, link-rods pivotally connecting said arms with the pivoted standards, and means for operating the rock-shaft, the crank-arms of the latter being so disposed relatively to the pivoted standards that when the latter are lowered, the pivotal connections between the link-rods and the crank-arms shall be included in a line drawn through the axis of the rock-shaft and the pivotal connections of the link-rods with the standards.

5. In a planter, a frame-beam having a vertical slot, a standard extending through the latter, a brace-rod secured to the under side of the frame-beam and terminating in a loop encircling said standard, a rock-shaft mounted transversely upon the frame and having an intermediately-disposed crank-arm, a link-rod connecting the latter with one of a plurality of perforations in the standard, and means for operating the rock-shaft.

6. In a planter, a frame, standards pivotally connected with the sides of the same, a vertically-movable standard fitted in a slot in the frame, a brace-rod having a loop encircling said standard, a rock-shaft mounted transversely upon the frame, cranks at the ends of said rock-shaft, link-rods connecting said cranks with the pivoted standards, an intermediately-disposed crank-arm upon the rock-shaft, a link-rod connecting the latter crank-arm with one of a plurality of perforations in the vertically-slidable standard, a crank-arm extended upwardly from the crank-shaft, an operating-lever having a lock-dog engaging a rack-segment, and a link-rod connecting said lever with the upwardly-extending arm of the rock-shaft.

In testimony that I claim the foregoing as my own I have hereto affixed my signature in the presence of two witnesses.

CHARLES L. FERRIOTT.

Witnesses:
THEO. JONES,
W. J. HARLAN.